United States Patent
Thapliya et al.

(10) Patent No.: US 9,692,661 B2
(45) Date of Patent: Jun. 27, 2017

(54) BANDWIDTH PREDICTION APPARATUS AND METHOD FOR PREDICTING A BANDWIDTH AT A FIRST POSITION, AND NON-TRANSITORY COMPUTER READABLE MEDIUM STORING A PROGRAM FOR ENABLING A COMPUTER TO EXECUTE SUCH BANDWIDTH PREDICTION

(71) Applicant: FUJI XEROX CO., LTD., Tokyo (JP)

(72) Inventors: Roshan Thapliya, Kanagawa (JP); Guanfeng Wang, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 99 days.

(21) Appl. No.: 14/717,604

(22) Filed: May 20, 2015

(65) Prior Publication Data

US 2016/0134485 A1    May 12, 2016

(30) Foreign Application Priority Data

Nov. 12, 2014    (JP) .................... 2014-229997

(51) Int. Cl.
*H04L 12/24* (2006.01)
*H04L 12/26* (2006.01)
*H04W 24/08* (2009.01)

(52) U.S. Cl.
CPC ........ *H04L 41/147* (2013.01); *H04L 43/0894* (2013.01); *H04L 41/22* (2013.01); *H04W 24/08* (2013.01)

(58) Field of Classification Search
None
See application file for complete search history.

(56) References Cited

U.S. PATENT DOCUMENTS

| 6,711,404 | B1 | 3/2004 | Arpee et al. | |
|---|---|---|---|---|
| 2007/0259670 | A1* | 11/2007 | Sakhpara | H04W 24/00 455/452.2 |
| 2011/0116374 | A1* | 5/2011 | Bearden | H04L 1/0001 370/234 |
| 2012/0064893 | A1 | 3/2012 | Reagor | |

OTHER PUBLICATIONS

Riiser, H. et al., "Video Streaming Using a Location-based Bandwidth-Lookup Service for Bitrate Planning," ACM Transactions on Multimedia Computing, Communications and Applications, 2011.
Peart, A., et al., "Predicting mobile network bandwidth fluctuation to enhance video stream service quality," Science and Information Conference 2013, Oct. 7-9, 2013, pp. 829-835.
(Continued)

*Primary Examiner* — Anh Ngoc Nguyen
(74) *Attorney, Agent, or Firm* — Oliff PLC

(57) ABSTRACT

There is provided a bandwidth prediction apparatus. An acquisition unit is configured to acquire position information indicating a first position at which a bandwidth is to be predicted. A prediction unit is configured to predict a bandwidth at the first position by using respective measured values of bandwidths measured in advance at a plurality of second positions.

12 Claims, 9 Drawing Sheets

(56) References Cited

OTHER PUBLICATIONS

Giannakis, G. B., 'Cartography for Cognitive Networks', Tutorial Slides presented on the Eighth Sensor Array and Multichannel Signal Processing Workshop, SAM 2014, Jun. 22, 2014, retrieved from <http://www.gtec.udc.es/sam2014/images/sam2014/tutorials/sam14tutor_giannakis_redsize.pdf> on Feb. 11, 2016.
Feb. 16, 2016 Office Action issued in Australian Patent Application No. 2015203099.
Yao et al., "Improving QoS in High-Speed Mobility Using Bandwith Maps," IEEE Transactions on Mobile Computing, vol. 11, No. 4, Apr. 2012, pp. 603-617.

* cited by examiner

BANDWIDTH PREDICTION APPARATUS AND METHOD FOR PREDICTING A BANDWIDTH AT A FIRST POSITION, AND NON-TRANSITORY COMPUTER READABLE MEDIUM STORING A PROGRAM FOR ENABLING A COMPUTER TO EXECUTE SUCH BANDWIDTH PREDICTION

CROSS-REFERENCE TO RELATED APPLICATIONS

This application is based on and claims priority under 35 U.S.C. §119 from Japanese Patent Application No. 2014-229997 filed on Nov. 12, 2014.

TECHNICAL FIELD

The present invention relates to a bandwidth prediction apparatus, a bandwidth prediction system, a bandwidth prediction method and a non-transitory computer readable medium.

SUMMARY

According to an aspect of the embodiments of the present invention, there is provided a bandwidth prediction apparatus comprising: an acquisition unit configured to acquire position information indicating a first position at which a bandwidth is to be predicted; and a prediction unit configured to predict a bandwidth at the first position by using respective measured values of bandwidths measured in advance at a plurality of second positions.

BRIEF DESCRIPTION OF THE DRAWINGS

Exemplary embodiments of the present invention will be described in detailed based on the following figures, wherein.

DETAILED DESCRIPTION

Figure 1:
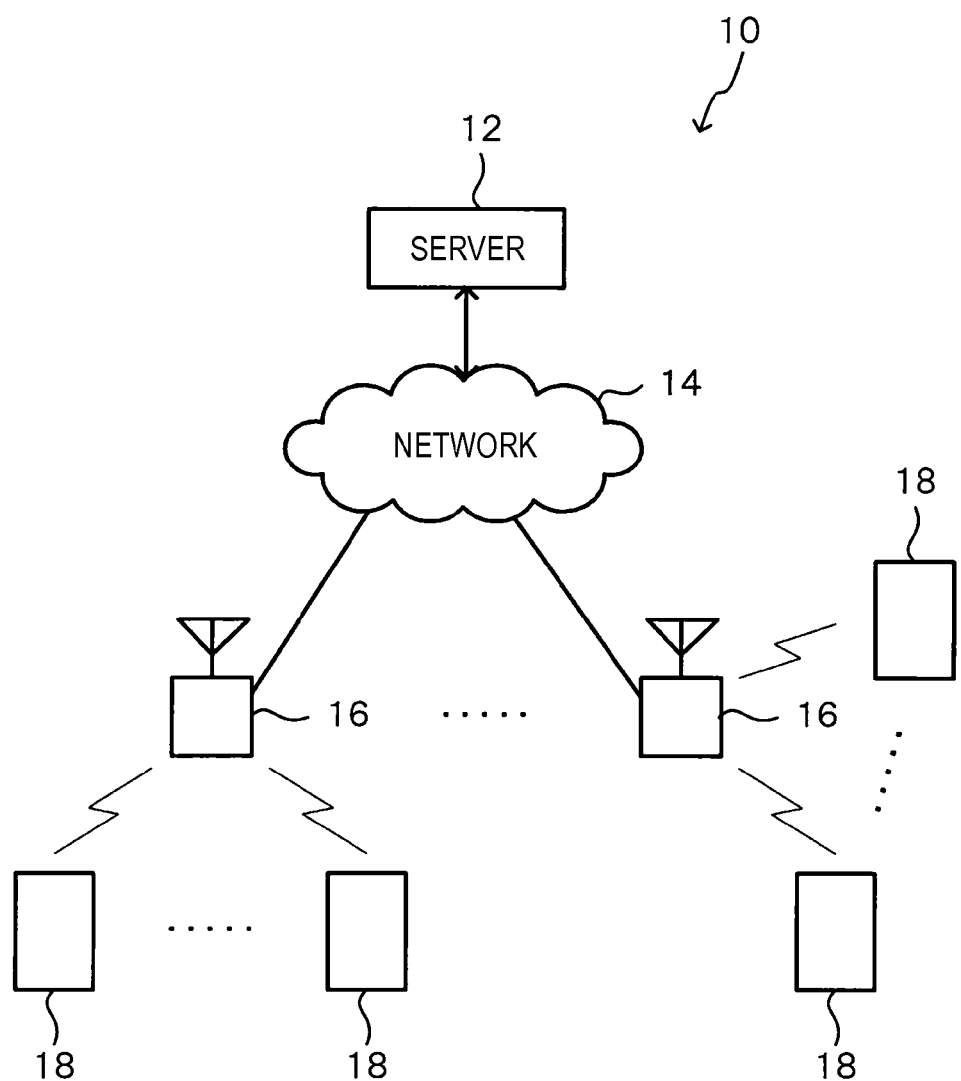
FIG. 1 illustrates a schematic configuration of a bandwidth prediction system according to an illustrative embodiment of the present invention.

Hereinafter, an illustrative embodiment of the present invention will be described with reference to the drawings. FIG. 1 illustrates a schematic configuration of a bandwidth prediction system according to an illustrative embodiment of the present invention.

As shown in FIG. 1, a bandwidth prediction system 10 includes a server 12, one or more base station apparatuses 16, and one or more client apparatuses 18. The server 12 and each base station apparatus 16 perform communication with each other through a network 14 such as an optical communication network. Also, the base station apparatus 16 and the client apparatus 18 perform communication with each other through a variety of wireless communications such as mobile communication and wireless LAN communication. That is, the server 12 and each client apparatus 18 perform communication with each other through the network 14 and the base station apparatus 16.

The server 12 has functions of preserving therein various contents such as a moving image and transmitting the preserved contents, in response to a request from the client apparatus 18, for example. Here, the server 12 is configured to select qualities (resolution, size and the like) of the data requested from the client apparatus 18, based on a communication bandwidth between the client apparatus 18 and the server 12, and to transmit the data having the selected qualities to the client apparatus 18.

The base station apparatus 16 is configured to perform wired communication with the server 12 and to perform wireless communication with each client apparatus 18 such as mobile communication. Regarding the wireless communication between the base station apparatus 16 and the client apparatus 18, a variety of communication methods such as 3G and 4G mobile communications are applied.

The client apparatus 18 includes a portable phone (including a multifunctional portable phone), a tablet terminal, and a computer such as a personal computer, which are operated by a user. The client apparatus 18 is configured to perform wireless communication with the base station apparatus 16 and to perform data communication with the server 12 through the base station apparatus 16. Thereby, the client apparatus 18 can receive a variety of contents such as a moving image from the server 12.

The bandwidth prediction system 10 of this illustrative embodiment has a function of predicting a bandwidth at any position. Specifically, the server 12 is configured to acquire a position of the client apparatus 18 and to predict a bandwidth at the position of the client apparatus 18. Also, the server 12 is configured to transmit data having qualities corresponding to the predicted bandwidth to the client apparatus 18.

Specifically, the server 12 is configured to store therein measured values of bandwidths at a plurality of positions together with position information, as a database. The server 12 is configured to predict a bandwidth at the position of the client apparatus 18 by using the stored database, and to transmit the data having qualities corresponding to the predicted bandwidth, as described above. Meanwhile, in this illustrative embodiment, bandwidths available at a plurality of positions are measured, so that a predicted value predicted by the server 12 is an available bandwidth, not a throughput of the bandwidth.

Figure 2:
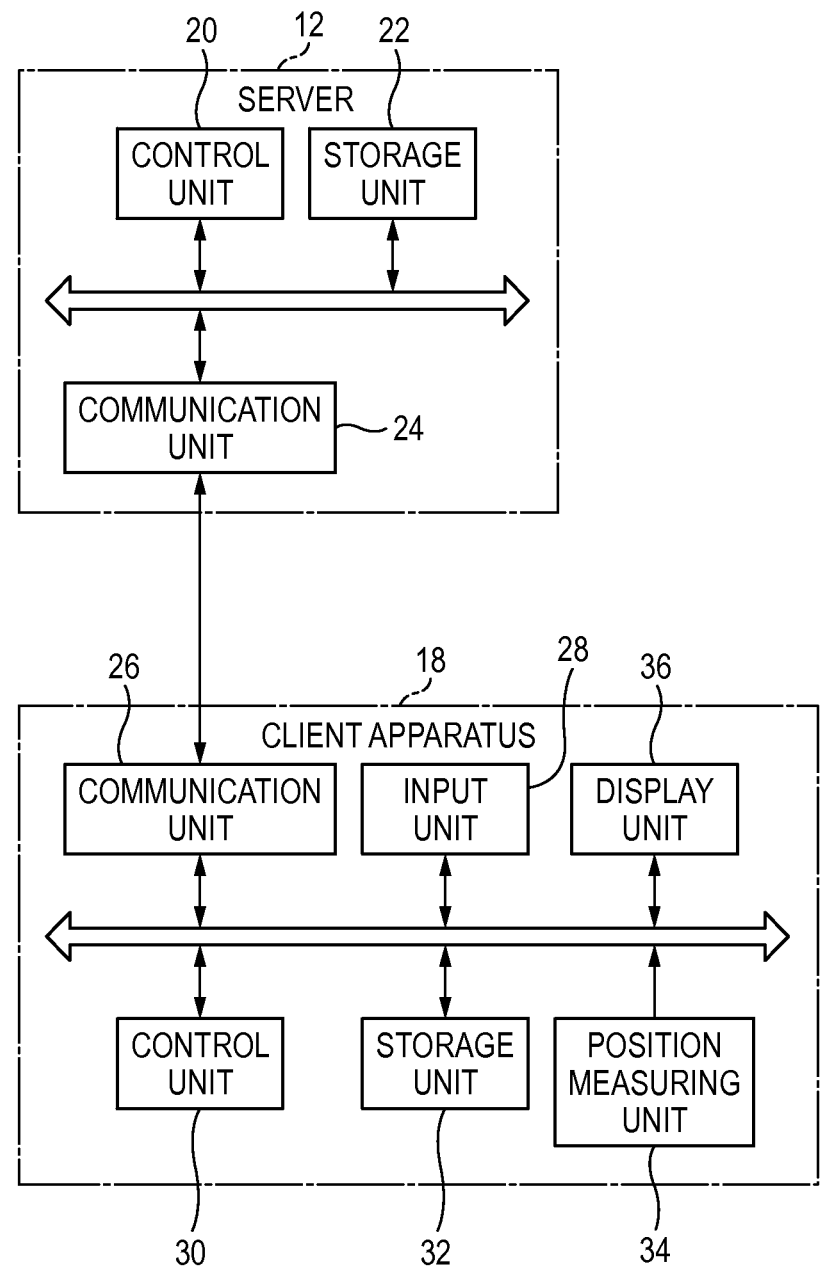
FIG. 2 is a block diagram showing configurations of a server and a client apparatus of the bandwidth prediction system according to the illustrative embodiment.

In the below, configurations of the server 12 and the client apparatus 18 for predicting the bandwidth as described above are described. FIG. 2 is a block diagram showing configurations of the server 12 and the client apparatus 18 of the bandwidth prediction system 10 according to the illustrative embodiment.

As shown in FIG. 2, the server 12 has a control unit 20, a storage unit 22 and a communication unit 24, which are respectively connected to a bus.

The control unit 20 includes a central processing unit (CPU), and is configured to execute a variety of processing and to control respective units of the server 12, in response to programs stored in advance in the storage unit 22.

The storage unit 22 is configured to store therein a variety of programs such as an operating system of the server 12 and data and to function as a memory for operation of the control unit 20. The programs may be stored in the server 12 through a variety of storage media such as an optical disc, a magnetic disc, a magnetic tape, a magneto optical disc, a flash memory and the like. Alternatively, the programs may be stored in the server 12 via a data communication means such as the Internet.

In the storage unit 22, a variety of contents such as moving image data, and a transmission table in which qualities of data to be transmitted for each bandwidth are defined are stored. Also, in the storage unit 22, bandwidths measured in advance at a plurality of positions are stored as a database in correspondence to the position information.

The communication unit 24 is configured to perform data communication with the base station apparatus 16 and the like through the network 14 and to perform data communication with the client apparatus 18 through the base station apparatus 16.

In the meantime, the client apparatus 18 has a control unit 30, a storage unit 32, a communication unit 26, an input unit 28, a display unit 36 and a position measuring unit 34.

The control unit 30 includes a CPU, and is configured to execute a variety of processing and to control respective units of the client apparatus 18, in response to programs stored in advance in the storage unit 32.

The storage unit 32 is configured to store therein a variety of programs such as an operating system of the client apparatus 18 and data and to function as a memory for operation of the control unit 30. The programs may be stored in the client apparatus 18 through a variety of storage media such as an optical disc, a magnetic disc, a magnetic tape, a magneto optical disc, a flash memory and the like. Alternatively, the programs may be stored in the client apparatus 18 via a data communication means such as the Internet.

The communication unit 26 includes a wireless communication antenna, for example, and is configured to perform communication with the base station apparatus 16 through the wireless communication antenna, thereby performing communication with the server 12.

The input unit 28 is implemented by a variety of input devices such as a touch panel and a keyboard, and is configured to receive an operation input from a user.

The display unit 36 is implemented by a variety of display devices such as a liquid crystal monitor, and is configured to display thereon a result of information processing of the control unit 30.

The position measuring unit 34 is configured to measure a current position of the client apparatus 18. For example, a signal from a global positioning system (GPS) satellite includes time data from an atomic clock mounted on the satellite, information about a satellite orbit, and the like. Therefore, the position measuring unit 34 is configured to receive a radio wave from the GPS satellite and to calculate a distance from the satellite on the basis of a time difference from transmission to reception. Also, the position measuring unit 34 is configured to measure a position of one point on a space on the basis of distances from three or more GPS satellites.

Subsequently, a method of predicting a bandwidth at any position by the server 12 is specifically described.

In this illustrative embodiment, a bandwidth is predicted on the basis of geographical statistics. More specifically, a bandwidth is predicted using variogram and kriging technologies.

First, a spatial relation of all data sets is examined. As all the data sets, bandwidths are beforehand measured at a plurality of positions and measured values of bandwidths corresponding to the position information are acquired in advance.

The variogram is a function describing a degree of spatial dependence of a spatial random field or stochastic process, and is defined as a variance of a difference between field values (in this illustrative embodiment, measured values of available bandwidths) at two locations.

Then, the obtained variogram is modeled. The modeling of the variogram includes selecting a mathematical formula and a value of a relating parameter.

When defining the measured value of the bandwidth as B={b1, b2, . . . , bn} and the measuring position of the bandwidth as P={u1, u2, . . . , un}, the variogram γ(h) is expressed as follows.

[Mathematical Formula 1]

$$\gamma(h) = \frac{1}{2N(h)} \sum_{N(h)} [Z(u) - Z(u+h)]^2 \quad (1)$$

Here, u indicates position information, and Z(u) indicates a value of the bandwidth at the corresponding position (bi=Z(ui)). The variogram is defined from a standpoint of a difference of data values at two spaced positions. N(h) indicates a number of combinations of a point Z(u) and Z(u+h) becoming a distance h. In the meantime, since an instant predicted value is sensitive to an outlier, a robust estimation is sometimes used. For the robust estimation of the variogram, a following equation (2) is used.

[Mathematical Formula 2]

$$\gamma(h) = \frac{1}{2N(h)} \frac{\sum (|Z(u) - Z(u+h)|^{1/2})^4}{0.457 + 0.494/N(h)} \quad (2)$$

Figure 3:
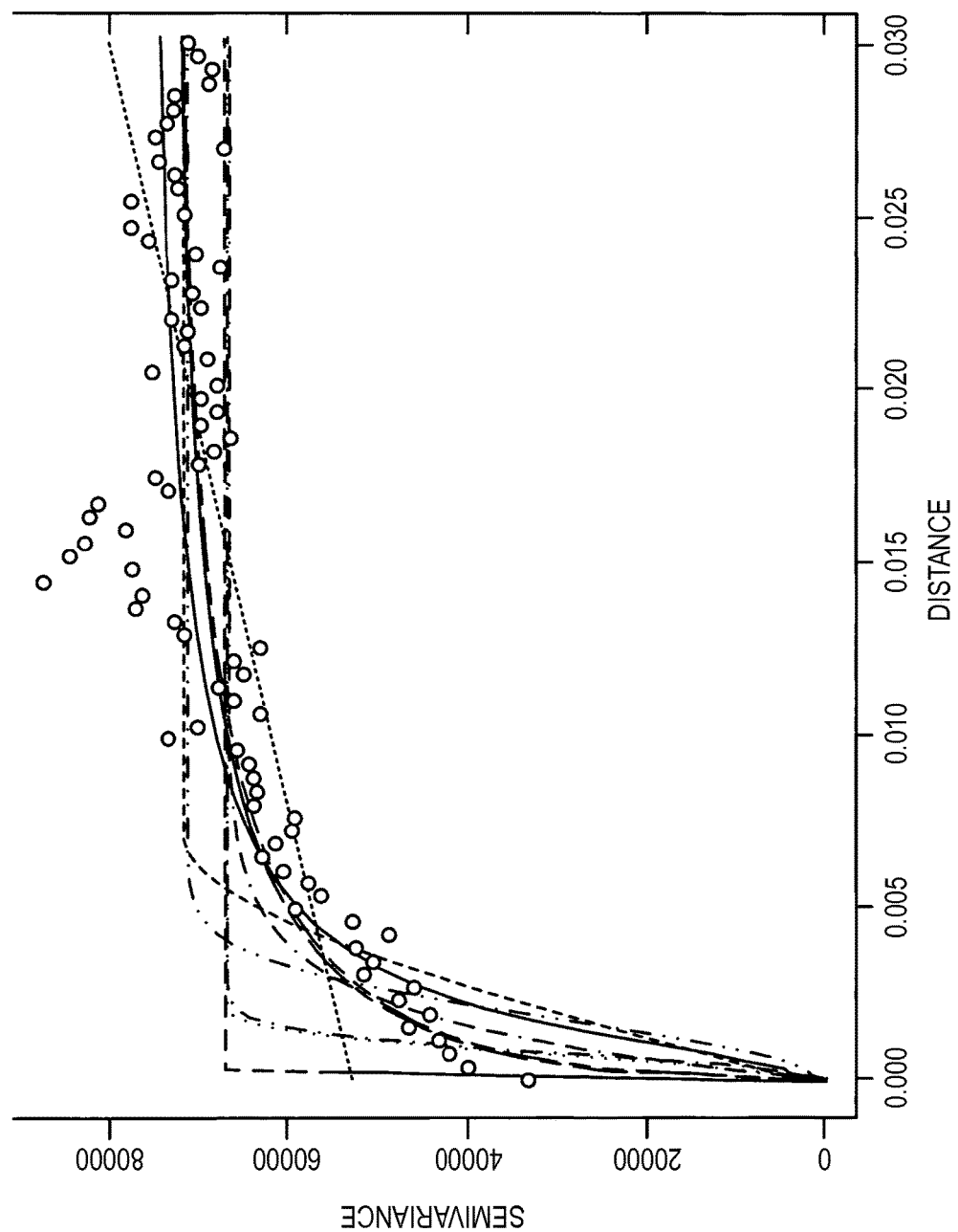
FIG. 3 illustrates an example of data modeled using a variogram model.

Here, an object of the variogram analysis is to establish a variogram for evaluating an autocorrelation structure of the stochastic process. In order to make a spatial prediction, a predicted value of the variogram γ(h) at the distance h, which is not provided as data, is required. Therefore, it is necessary to establish the variogram model after obtaining the variogram γ(h). The variogram cannot guarantee a variance of the predicted values. However, it is possible to secure the variance in the variogram model. For example, the variogram models of various parameters are exemplified as follows. In the meantime, an example where data is modeled using following variogram models is shown in FIG. 3.

[Mathematical Formula 3]

Linear: $\gamma(h) = C0 + b*h$

Power model: $\gamma(h) = C0 + b*h^\alpha$

Exponential model: $\gamma(h) = C0 + C1(1 - e^{-h/\alpha})$

Gaussian model: $\gamma(h) = C0 + C1(1 - e^{-(h/\alpha)^2})$

Power exponential model: $\gamma(h) = C0 + C1(1 - e^{-(h/\alpha)^p})$

Cauchy model: $\gamma(h) = C0 + C1\left[1 - \left(1 + \frac{h^2}{\alpha^2}\right)^{-k}\right]$ Matern model: $\gamma(h) = C0 + \left[1 - \frac{1}{2^{k-1}\Gamma(k)}\left(\frac{h^k}{\alpha}\right)K_k\left(\frac{h}{\alpha}\right)\right]$ Spherical model: $\gamma(h) = C0 + C1\left(\frac{3h}{2\alpha} - \frac{h^3}{8\alpha^3}\right)$ Here, the parameters (for example, b, a, C0 and the like) of the variogram models are estimated using a usual least-square method. Meanwhile, in the usual least-square method, a distance between locations is set as a weight. Also, the parameters are estimated by minimizing a following function.

[Mathematical Formula 4]

$$\hat{\theta} = \operatorname{argmin}_\theta \sum_h N(h)(\hat{\gamma}(h) - \gamma(h, \theta))^2$$

After performing the variogram analysis, as described above, an appropriate theoretical model is obtained together with the estimated parameters. Subsequently, the kriging is used so as to predict a bandwidth at any position at which a bandwidth has not been measured. In the meantime, here, the kriging is synonymous with the optimal prediction. Also, the kriging is a method of predicting unknown data from observed data around a point to be predicted. The kriging uses the variogram so as to express a spatial variation. The kriging minimizes an error of a predicted value estimated by a spatial distribution of predicted values. Also, the kriging predicts a value of a point to be predicted by allotting a weight decreasing over an increase of a separated distance. Also, the kriging allots a weight by a weighting function of a data driving type, instead of any function. A predictive quantity of the basic kriging is calculated by a following equation (3).

[Mathematical Formula 5]

$$Z^*(u) - m(u) = \sum_{k=1}^{N} \lambda_k [Z(u_k) - m(u_k)] \quad (3)$$

Here, u indicates a position to be predicted, uk indicates one of neighboring data points, and k indicates a number of known data points at ambient data points used for prediction. Also, m(u) and m(uk) indicate expected values of Z(u) and Z(uk), and λk indicates a weight of kriging for position to be predicted u. Even the same data has different weights at different positions to be predicted. The kriging performs remaining estimation at the position to be predicted u, as a weighted sum of residuals at ambient positions. Also, the weight λk characterizing a remaining component is deduced from the modeled variogram. When the usual kriging is adopted as the approximation and is assumed to be constant in the vicinity of each estimation point, a following equation is established.

$m(uk) = m(u)$

Thereby, a following equation (4) is deduced from the equation (3).

[Mathematical Formula 6]

$$Z^*(u) = m(u) + \sum_{k=1}^{N} \lambda_k(u)[Z(u_k) - m(u)] \quad (4)$$

$$= \sum_{k=1}^{N} \lambda_k(u)Z(u_k) + \left[1 - \sum_{k=1}^{N} \lambda_k(u)\right]m(u)$$

A sum of the weights of the kriging is made to be 1, so that an unknown local average is filtered. That is, a following equation (5) is satisfied so as to deduce an appropriate predicted value.

[Mathematical Formula 7]

$$\sum_{k=1}^{N} \lambda_k(u) = 1 \quad (5)$$

Thereby, a predicted value is obtained by a following equation (6).

[Mathematical Formula 8]

$$Z^*_{OK}(u) = \sum_{k=1}^{N} \lambda_k(u) Z(u_k) \quad (6)$$

Due to the limitation that the sum of weights is 1, an addition item including a Lagrange's parameter μOK(u) having an error variance added thereto is minimized so as to minimize targets of the error variance. That is, a following formula is established.

[Mathematical Formula 9]

$$L = \sigma_E^2(u) + 2\mu_{OK}(u)\left[1 - \sum_{k=1}^{N} \lambda_k(u)\right]$$

$$\frac{\partial L}{2\partial_\mu} = 1 - \sum_{k=1}^{N} \lambda_k(u) = 0$$

Therefore, when solving the above formula, a weight of the kriging is obtained.

[Mathematical Formula 10]

$$\sum_{k=1}^{N} \lambda_k(u)C(u_i - u_k) + \mu_{OK}(u) = C(u_i - u)$$

where i=1, ..., N, and $\Sigma_{k=1}^{N}\lambda_k(U) = 1$.

Also, a covariance C(h) is deduced from the above variogram, as expressed in a following equation (7).

[Mathematical Formula 11]

$$C(h) = \frac{1}{N}\sum_{k=1}^{N} Z(u_k)Z(u_k + h) - \frac{1}{N}\sum_{k=1}^{N} Z(u_k) - \frac{1}{N}\sum_{k=1}^{N} Z(u_k + h) \quad (7)$$

Like the Lagrange parameter, when the weight of the kriging is obtained, an appropriate error variance is deduced, as expressed in a following equation (8).

[Mathematical Formula 12]

$$\sigma_E^2 = C(0) - \sum_{k=1}^{N} \lambda_k(u)C(u_k - u) - u_{OK}(u) \quad (8)$$

Figure 4:
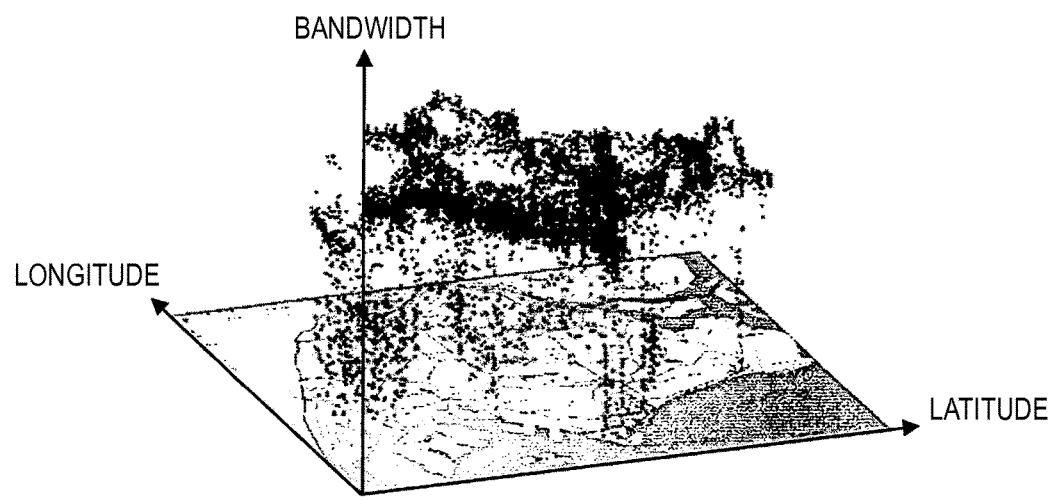
FIG. 4 is a pictorial view illustrating an example of measurement results of bandwidths at a region.

In the below, an example where the prediction using the variogram and kriging is made by using measured values of bandwidths at a predetermined region is described. FIG. 4 is a pictorial view illustrating an example of measured values of bandwidths at a region.

Figure 5:
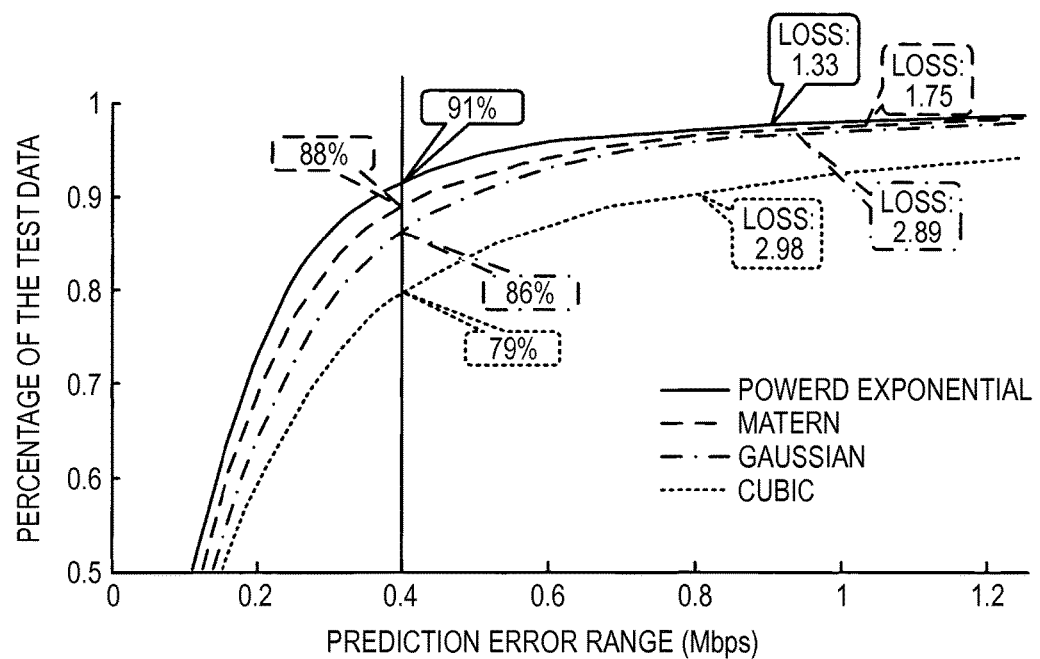
FIG. 5 illustrates a comparison result of cumulative distribution functions (CDF) in four models (powered exponential, matern, Gaussian and cubic)
Figure 6:
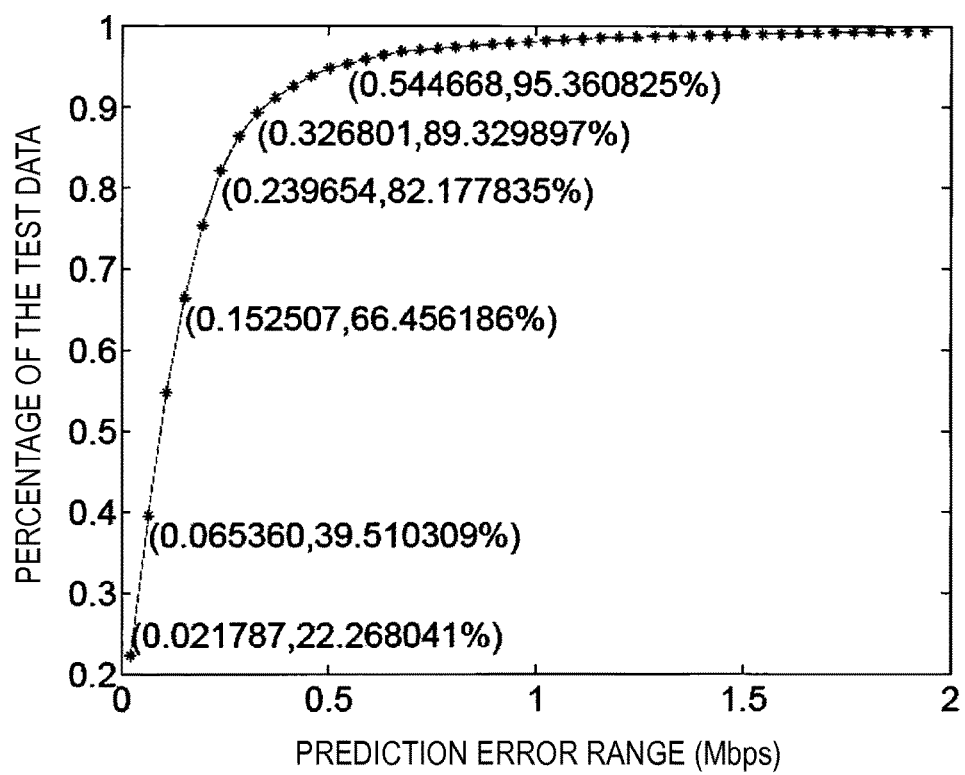
FIG. 6 illustrates a detailed cumulative distribution function of a kriging prediction result in the powered exponential model.

As described above, all the variograms are enumerated. Also, in the below, the four upper models of the above-mentioned models, in which the loss, which is caused when performing the kriging, is smaller, are enumerated for comparison. FIG. 5 illustrates a comparison result of cumulative distribution functions (CDF) in four models (powered exponential, matern, Gaussian and cubic). As shown in FIG. 5, the loss, which is caused when performing the kriging, is smallest in the powered exponential model. Therefore, it can be seen that the kriging prediction result of the powered exponential model is better than the other models. In particular, when a prediction error range is set to 0.4 Mbps, 91% of the predicted values is within an allowed error range of the measured value of the actual bandwidth. FIG. 6 illustrates a detailed cumulative distribution function of a kriging prediction result in the powered exponential model.

Figure 7:
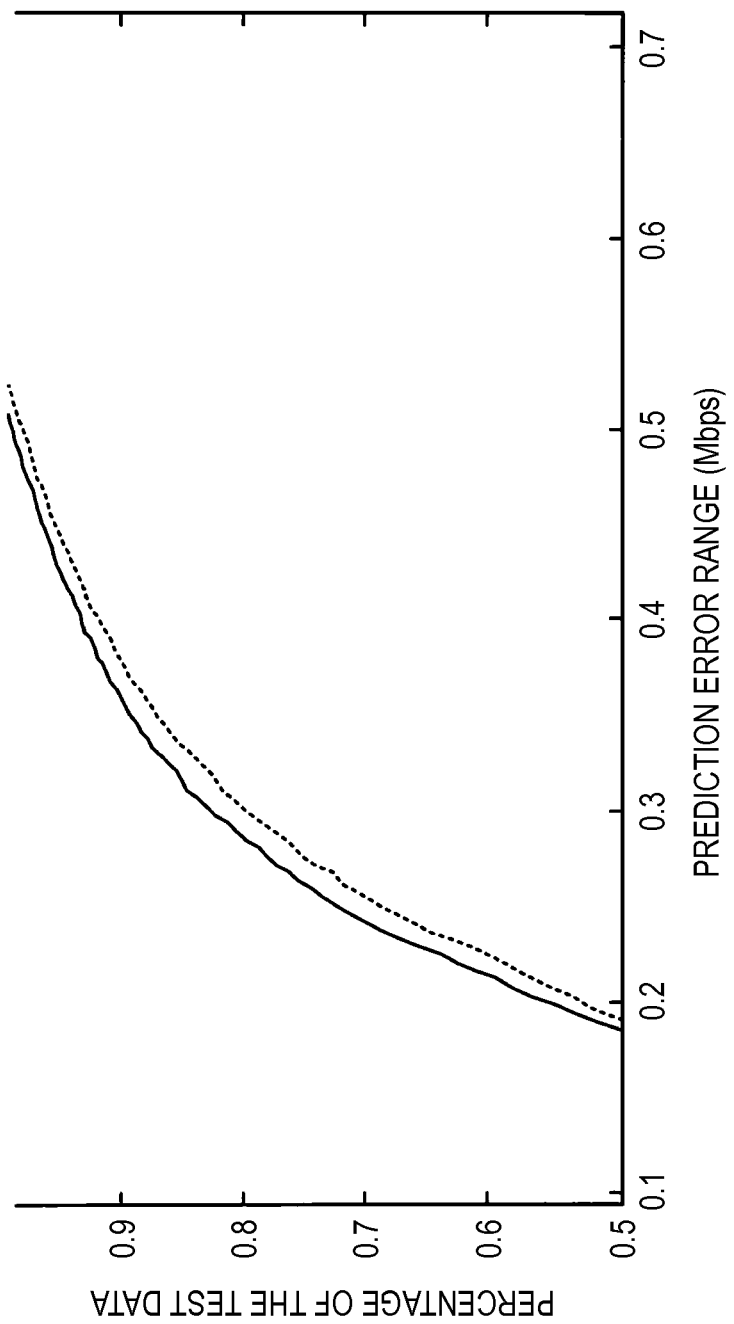
FIG. 7 illustrates cumulative distribution functions of prediction results of the illustrative embodiment and a KNN interpolation method.

Here, the illustrative embodiment and a conventional bandwidth mapping model are compared. In the below, a recently published KNN interpolation method (Jia Hao, Roger Zimmermann, and Haiyang Ma. GTube: Geo-Predictive Video Streaming over HTTP in Mobile Environments. In Proceedings of the 5th ACM Multimedia Systems Conference, pages 259-270, 2014.), which is an example of the conventional bandwidth mapping model, and the illustrative embodiment are compared. In the respective methods, the bandwidth is predicted at any position by using the same data set (measured values of bandwidths at a plurality of positions), so that a cumulative distribution function of the prediction result is obtained. FIG. 7 illustrates cumulative distribution functions of prediction results of the illustrative embodiment and the KNN interpolation method. As shown in FIG. 7, it can be seen that the prediction method using the variogram and kriging of the illustrative embodiment shown with the solid line is better than the KNN interpolation method shown with the dotted line within the error range.

Figure 8:
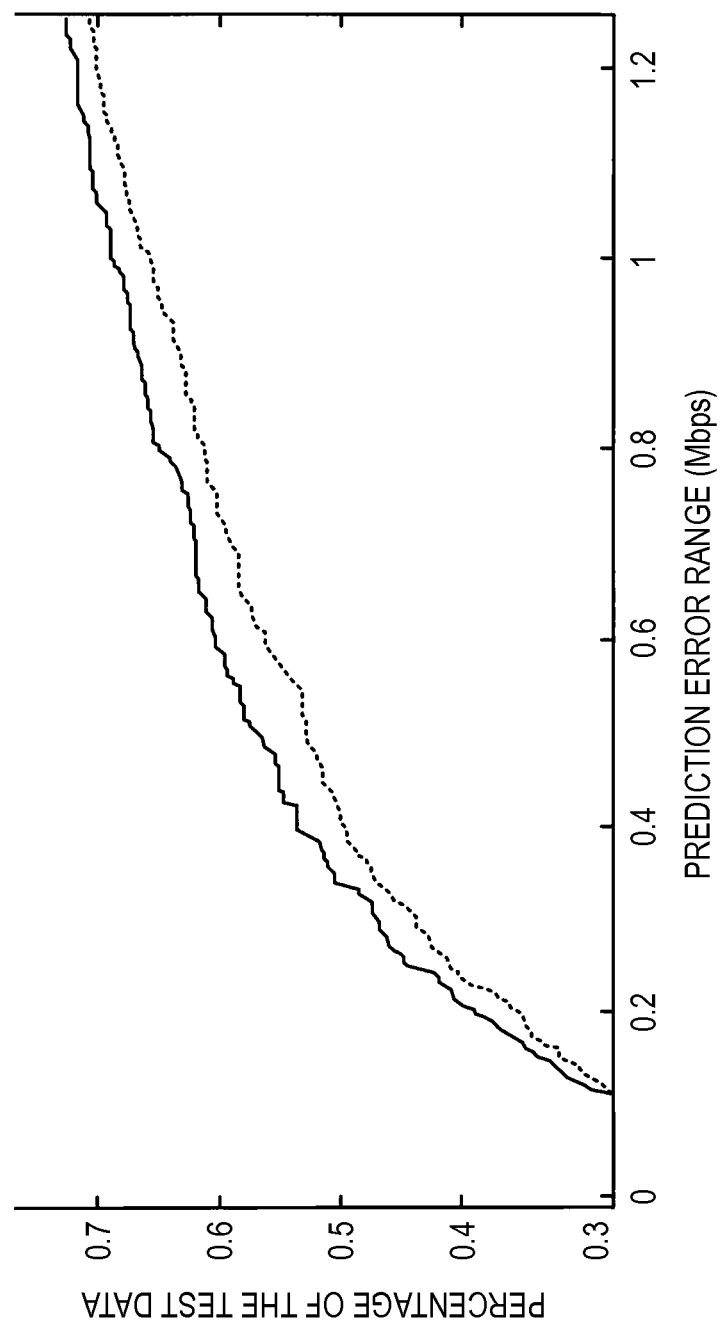
FIG. 8 illustrates cumulative distribution functions of prediction results of the illustrative embodiment and the KNN interpolation method in a 3G/4G mixed area.

Further, the measured data in the 3G/4G mixed area is extracted and compared from the whole measured data group. As described above, the bandwidth is predicted at any position by using the same bandwidth measuring results, so that a cumulative distribution function of the prediction result is obtained. FIG. 8 illustrates cumulative distribution functions of prediction results of the illustrative embodiment and the KNN interpolation method in the 3G/4G mixed area. Also in the mixed area, it can be seen that the prediction method using the variogram and kriging of the illustrative embodiment shown with the solid line is better than the KNN interpolation method shown with the dotted line within the error range.

In the below, the specific operations of the client apparatus 18 and server 12 of the bandwidth prediction system 10 according to the illustrative embodiment are described.

Figure 9:
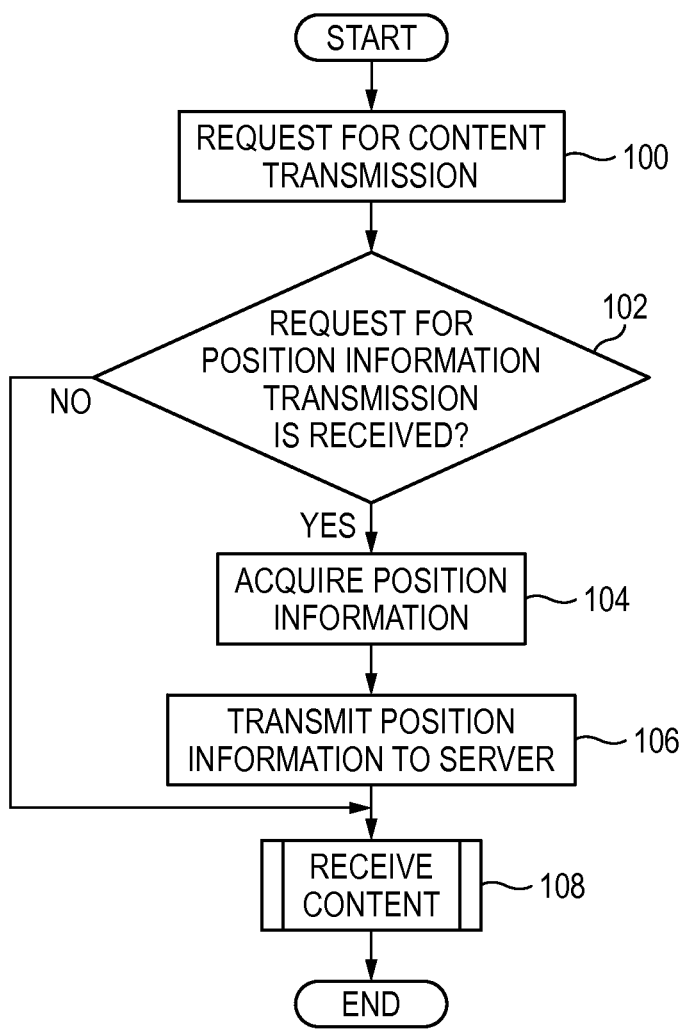
FIG. 9 is a flowchart showing an example of processing that is executed in the client apparatus of the bandwidth prediction system according to the illustrative embodiment.

First, the specific operations of the client apparatus 18 are described. FIG. 9 is a flowchart showing an example of processing that is executed in the client apparatus 18 of the bandwidth prediction system 10 according to the illustrative embodiment. In the meantime, the processing of FIG. 9 relates to an example where it starts when an operation of requesting the server 12 to transmit contents is performed on the input unit 28 of the client apparatus 18.

In step 100, the control unit 30 requests the server 12 to transmit contents, through the communication unit 26, and proceeds to step 102.

In step 102, the control unit 30 determines whether a position information transmission request is received from the server 12. When a result of the determination is negative, the control unit 30 proceeds to step 108, and otherwise, proceeds to step 104.

In step 104, the control unit 30 acquires the position information from the position measuring unit 34, and proceeds to step 106. That is, the control unit 30 acquires the current position information measured by the position measuring unit 34.

In step 106, the control unit 30 transmits the position information to the server 12 through the communication unit 26, and proceeds to step 108.

In step 108, the control unit 30 performs content receiving processing and ends the series of processing. The content receiving processing is processing of sequentially receiving contents transmitted from the server 12 and displaying the same on the display unit 36, and the like.

Figure 10:
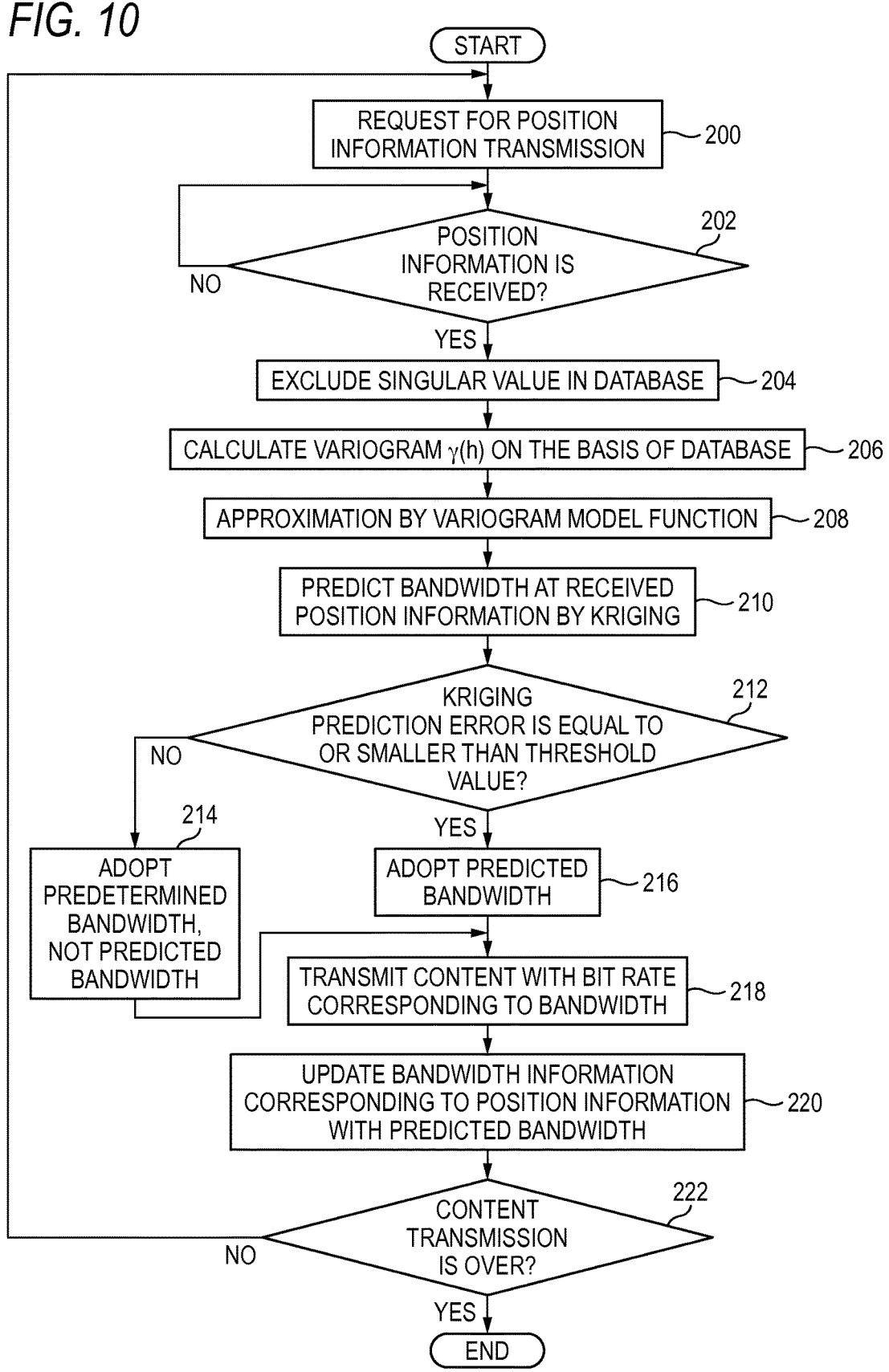
FIG. 10 is a flowchart showing an example of processing that is executed in the server of the bandwidth prediction system according to the illustrative embodiment.

Subsequently, the specific operations of the server 12 are described. FIG. 10 is a flowchart showing an example of processing that is executed in the server 12 of the bandwidth prediction system 10 according to the illustrative embodiment. In the meantime, the processing of FIG. 10 relates to an example where it starts when the content transmission request is issued from the client apparatus 18.

In step 200, the control unit 20 requests the client apparatus 18, which is a source of the content transmission request, to transmit the position information, through the communication unit 24, and proceeds to step 202.

In step 202, the control unit 20 determines whether the position information transmission is received. The control unit 20 stands by until a result of the determination is positive, and then proceeds to step 204.

In step 204, the control unit 20 excludes a singular value of the database stored in advance in the storage unit 22, and proceeds to step 206. For example, the control unit 20 specifies a point at which an RTO (Retransmission Time Out) upon measurement of the bandwidth is equal to or smaller than a predetermined lower limit, and excludes a value measured at the corresponding point, as the singular value.

In step 206, the control unit 20 calculates the variogram γ(h) on the basis of the database (bandwidth measuring results) stored in the storage unit 22, and proceeds to step 208.

In step 208, the control unit 20 performs approximation by the variogram model function, and proceeds to step 210. As described above, the control unit 20 performs approximation by a plurality of types of models, thereby deducing an optimal variogram model function.

In step 210, the control unit 20 uses the variogram model function to predict a bandwidth at the received position information by the kriging, and proceeds to step 212. Thereby, the bandwidth at any position except for the measuring positions of the bandwidths stored in the storage unit 22 is predicted. In the meantime, when the client apparatus 18 is moving, the server 12 may acquire the position information at different times from the client apparatus 18 to predict a moving position, and predict a bandwidth at the predicted moving position.

In step 212, the control unit 20 determines whether the prediction error of the kriging is equal to or smaller than a threshold value. For example, the control unit 20 determines whether the calculated error variance is equal to or smaller than a threshold value. When a result of the determination is negative, the control unit 20 proceeds to step 214, and otherwise, proceeds to step 216.

In step 214, the control unit 20 adopts a predetermined bandwidth, not the predicted bandwidth, and proceeds to step 218. In the meantime, the predetermined bandwidth may be a bandwidth adopted in the previous processing.

On the other hand, in step 216, the control unit 20 adopts the predicted bandwidth, and proceeds to step 218.

In step 218, the control unit 20 transmits the content with a bit rate corresponding to the predicted bandwidth, and proceeds to step 220. Thereby, when the transmitted content is a moving image, the moving image is smoothly transmitted without a disturbance or stop of the image.

In step 220, the control unit 20 updates the bandwidth at the current position of the client apparatus 18 to the predicted bandwidth, and proceeds to step 222. Thereby, the precision is improved when predicting the bandwidth next time.

In step 222, the control unit 20 determines whether the content transmission is over. When a result of the determination is negative, the control unit 20 returns to step 200 and repeats the above processing, and when a result of the determination is positive, the control unit 20 ends the series of processing.

In the above illustrative embodiment, the server 12 predicts the bandwidth at the current point of the client apparatus 18 and transmits the content with the bit rate corresponding to the predicted bandwidth. However, the present invention is not limited thereto. For example, a map and the like are displayed on the display unit 36 of the client apparatus 18, and the user designates any position on the displayed map to designate a prediction position of the bandwidth. Then, the server 12 makes a prediction about a bandwidth at the designated position by the variogram and kriging and transmits the predicted bandwidth to the client apparatus 18. Thereby, it is possible to display a predicted value of the bandwidth at the designated position on the display unit 36 of the client apparatus 18.

Also, in the above illustrative embodiment, the server 12 makes a prediction about the bandwidth by the variogram and kriging. However, the present invention is not limited thereto. For example, the database of the measured values may be stored in the server 12, like the above illustrative embodiment, and the prediction using the variogram and kriging may be made by the client apparatus 18.

Also, in the above illustrative embodiment, the system in which the server 12 and the client apparatus 18 are connected through the network has been exemplified. However, it may also be possible to predict a bandwidth at any position by the variogram and kriging at a single apparatus.

Also, in the above illustrative embodiment, the computer is enabled to execute the various programs. However, a part or all of the processing that is executed by the respective programs may be executed by the hardware.

Also, the respective processing that is executed in the bandwidth prediction system according to the above illustrative embodiment may be distributed with being stored as a program in a storage medium.

Also, the present invention is not limited to the above and can be variously modified and implemented without departing from the gist thereof.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A bandwidth prediction apparatus comprising:
a memory that stores a program; and
at least one processor that is instructed by the program to perform the functions of:
an acquisition unit configured to acquire position information indicating a first position at which a value of a bandwidth is to be predicted; and
a prediction unit configured to predict the value of the bandwidth at the first position by using respective measured values of bandwidths measured in advance at a plurality of second positions,
wherein the prediction unit is configured to minimize an error of the predicted value of the bandwidth at the first position by a spatial distribution of the plurality of second positions.

2. The bandwidth prediction apparatus according to claim 1, wherein the prediction unit is configured to predict the value of the bandwidth at the first position by using a spatial variation to make the prediction.

3. The bandwidth prediction apparatus according to claim 1, wherein the prediction unit is configured to predict the value of the bandwidth at the first position by a variogram representing a spatial correlation of the plurality of second positions, and a kriging.

4. The bandwidth prediction apparatus according to claim 1, wherein the prediction unit comprises an exclusion unit configured to exclude a singular value from the respective measured values of the bandwidths of the plurality of second positions.

5. The bandwidth prediction apparatus according to claim 1, further comprising a storage unit configured to store the respective measured values of the bandwidths of the plurality of second positions as a database, and the at least one processor also functions as an update unit configured to update the database by using the value of the bandwidth predicted by the prediction unit.

6. The bandwidth prediction apparatus according to claim 1, wherein when a predicted error of the value of the bandwidth at the first position is equal to or smaller than a predetermined threshold value, the prediction unit adopts a prediction result of predicting the value of the bandwidth at the first position.

7. The bandwidth prediction apparatus according to claim 1, wherein the acquisition unit comprises a position prediction unit configured to acquire a plurality of position information of a moving object at a plurality of different times and to predict the position of the moving object from the acquired position information of the moving object at the plurality of different times, and the acquisition unit is configured to acquire a prediction result of the position prediction unit as the position information.

8. The bandwidth prediction apparatus according to claim 1, further comprising a transmission unit configured to transmit predetermined information in correspondence to the value of the bandwidth predicted by the prediction unit.

9. The bandwidth prediction apparatus according to claim 1, wherein the prediction unit is configured to predict the value of the available bandwidth at the first position by using respective measured values of available bandwidths measured in advance at a plurality of second positions.

10. A bandwidth prediction system comprising:
the bandwidth prediction apparatus according to claim 1; and
a client apparatus comprising a communication unit configured to transmit the position information and to receive a prediction result of the prediction unit, and a display unit configured to display the prediction result of the prediction unit received through the communication unit.

11. A bandwidth prediction method of a bandwidth prediction apparatus comprising a memory that stores a program, and at least one processor that is instructed by the program to perform a method comprising the steps of:
acquiring, with the at least one processor, position information indicating a first position at which a value of a bandwidth is to be predicted; and
predicting, with the at least one processor, the value of the bandwidth at the first position by using respective measured values of bandwidths measured in advance at a plurality of second positions, wherein the predicting step minimizes an error of the predicted value of the bandwidth at the first position by a spatial distribution of the plurality of second positions.

12. A non-transitory computer readable medium storing bandwidth prediction program for enabling a computer to execute a bandwidth prediction process, the computer comprising a memory that stores a program, and at least one processor that is instructed by the program to perform the bandwidth prediction process comprising the steps of:
acquiring, with the at least one processor, position information indicating a first position at which a value of a bandwidth is to be predicted; and
predicting, with the at least one processor, the value of the bandwidth at the first position by using respective measured values of bandwidths measured in advance at a plurality of second positions, wherein the predicting step minimizes an error of the predicted value of the bandwidth at the first position by a spatial distribution of the plurality of second positions.

* * * * *